Feb. 4, 1936.        T. BRADY         2,029,460
             DRINK VENDING MACHINE
             Filed Feb. 27, 1933    4 Sheets-Sheet 1

INVENTOR
Thomas Brady,
BY
George D. Richards
ATTORNEY

Feb. 4, 1936.     T. BRADY     2,029,460
DRINK VENDING MACHINE
Filed Feb. 27, 1933     4 Sheets-Sheet 2

INVENTOR
Thomas Brady,
BY George S. Richards
ATTORNEY

Feb. 4, 1936. T. BRADY 2,029,460
DRINK VENDING MACHINE
Filed Feb. 27, 1933 4 Sheets-Sheet 3

INVENTOR
Thomas Brady,
BY
George D. Richards
ATTORNEY

Feb. 4, 1936. T. BRADY 2,029,460
DRINK VENDING MACHINE
Filed Feb. 27, 1933 4 Sheets-Sheet 4

INVENTOR
Thomas Brady,
BY
George S. Richards
ATTORNEY

Patented Feb. 4, 1936

2,029,460

UNITED STATES PATENT OFFICE 2,029,460

DRINK VENDING MACHINE

Thomas Brady, West Caldwell, N. J.

Application February 27, 1933, Serial No. 658,693

7 Claims. (Cl. 225—21)

This invention relates, generally, to vending machines; and the invention has reference, more particularly, to a novel food and drink vending machine.

Vending machines heretofore used for vending foods and drinks have seldom proved successful in use because such machines are usually quite complicated in structure and hence expensive to manufacture, and, owing to their complex nature, these machines become easily deranged, requiring frequent and expensive repairs. Furthermore, many of the vending machines heretofore designed are not foolproof and have been easily put out of operation by unauthorized tampering therewith and improper operation thereof; and, furthermore, many of these machines are unsanitary and hence undesirable for this reason. Many of the drink vending machines heretofore used fail to deliver the correct quantity of drink, said machines at times delivering too little liquid and at other times delivering too much of the dispensed drink.

The principal object of the present invention is to provide a novel food and drink vending machine which is of simple, rugged and reliable construction, the said machine being adapted to be produced at a very reasonable cost and maintained in use at little expense, the said machine being substantially foolproof and easily operated by the use of coin chutes to effect the dispensing of food and drink.

Another object of the present invention lies in the provision of a novel food and drink vending machine of the above character having one or more coin controlled and intermittently movable food containers therewithin, each of which food containers is divided into a plurality of consecutive shelves or pockets for receiving individual portions of the food to be dispensed through a door provided in the casing of the machine, the intermittent movement of a food container serving to position sucessive pockets thereof opposite the door of the casing, whereby the purchaser is enabled to remove the purchased food.

Still another object of the present invention is to provide a novel food and drink vending machine of the above character having food containers provided with easily readable signs, "Empty", the "Empty" sign of a container being displayed thereby when all of the food of the container has been dispensed, the coin chute controlled means for operating said food container being so constructed as to return the purchaser's coin to him should he attempt to secure food from the food container after the same is empty.

A fourth object of the present invention lies in the provision of a novel food and drink vending machine of the above character having coin controlled means for dispensing drinks at any desired temperature, either hot or cold, the said dispensing means including a measuring valve so constructed and arranged as to accurately measure and dispense the desired quantity of drink without waste or drip.

A fifth object of the present invention is to provide a novel food and drink vending machine of the above character which is so constructed and arranged as to enable the easy and quick replenishment of food and drink therein, the said machine having thermostatically controlled means for maintaining the dispensed drink at a desired temperature.

Other objects of this invention, not at this time more particularly enumerated, will be clearly understood from the following detailed description of the same.

The invention is clearly illustrated in the accompanying drawings, in which.

Similar characters of reference are employed in all of the above described views to indicate corresponding parts.

Referring now to said drawings, the reference numeral 1 designates the novel food and drink vending machine of this invention as a whole, the said machine comprising a substantially rectangular casing closed at its top and bottom and having a front wall 2, a rear wall 3 and side walls consisting of removable upper and lower panels 4 and 5, respectively. The upper portion of the front wall 2 is fixed to the frame 6 of the machine and is formed with a central rectangular opening 7 providing access to a box-like recess 8 within the casing, the boundaries of which recess are defined by a rectangular casing member 9 open at its front and disposed so as to register with the opening 7 in the front wall of the machine.

Figure 2:
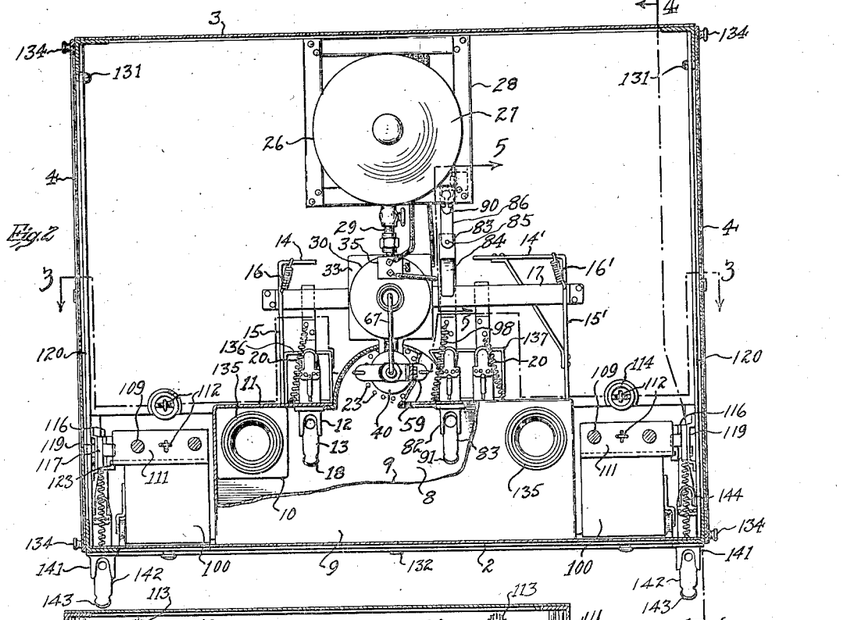
Fig. 2 is an enlarged sectional view, with parts broken away, taken substantially along line 2—2 of Fig. 1 looking in the direction of the arrows.
Figure 3:
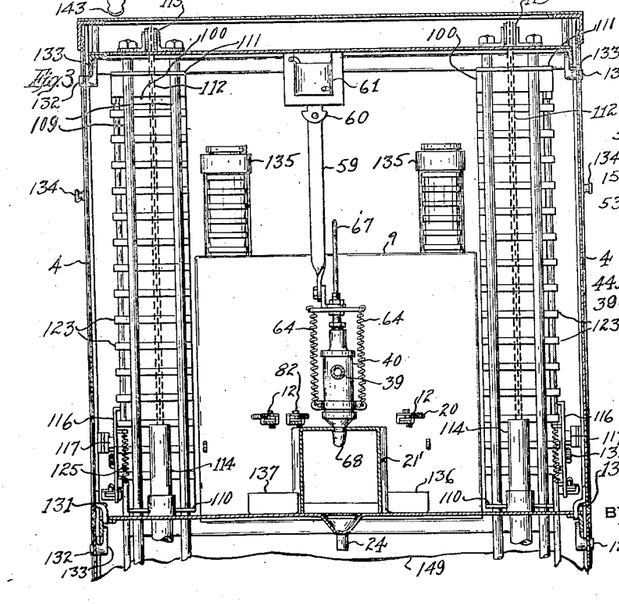
Fig. 3 is a fragmentary sectional view taken substantially along line 3—3 of Fig. 2, looking in the direction of the arrows.

A pair of cup dispensers 10 and 10' are positioned within the recess 8 and are mounted upon the rear wall 11 of the casing member 9 adjacent the side walls of this casing member. Coin chutes 12 are positioned adjacent the cup dispensers 10 and 10' for use in discharging cups from these dispensers. Any standard type of coin chute 12 may be employed and as the structure of these coin chutes does not form a part of this invention, it would appear that these coin chutes would not require a detailed description. The slides 13 of the coin chutes 12 (see especially Fig. 2) are adapted to engage and actuate the offset inner end portions 14 and 14' of the cup dispenser operating bars 15 and 15'. The operating bars 15 and 15' extend forwardly and through apertures in the rear wall 11 of casing member 9 and into the housings of the cup dispensers 10 and 10', respectively, for operating these cup dispensers.

Coil tension springs 16 and 16' are connected respectively to the offset inner end portions 14 and 14' of the operating bars and are also connected to a stationary frame 17 and serve to normally hold the operating bars 15 and 15' in their forward inoperative positions. When a coin is inserted into one of the coin chutes 12 and the knob 18 thereof is pushed rearwardly, the slide 13 of the coin chute will engage one of the offset inner end portions 14 or 14', depending upon which coin chute is used, thereby causing rearward operative movement of one of the operating bars 15 and 15' and effecting the dispensing of a cup from the corresponding cup dispenser. The coin chutes 12 are illustrated as having tension springs 20 attached to their slides 13, which tension springs serve to return the operating knobs 18 of the coin chutes to their forward outermost positions after an operation of these coin chutes. Although two cup dispensers 10 and 10' are shown in the drawings, it will be apparent that only one of these cup dispensers may be used, if desired, or more than two of these cup dispensers may be used.

A substantially semi-cylindrical recess 21 having a rear wall 21' is provided in the lower central portion of the rear wall 11 of casing member 9 for the purpose of receiving cups 22 while these cups are being filled with the dispensed drink. A drain 23 is provided at the bottom of the recess 21 for supporting the cup while the cup is being filled and for conveying any spilt liquid to a discharge pipe 24 which is adapted to discharge such liquid into a suitable pail or other container 25 positioned in the bottom of the machine casing.

The apparatus for supplying the drink to the cups 22 comprises a main supply vessel or container 26 preferably having a removable top 27 for enabling the ready filling of the vessel with the desired drink. The vessel 26 is illustrated as mounted upon a suitable supporting frame structure 28 which serves to position the vessel 26 above a cup 22 receiving the drink. Discharge piping 29 is connected to the bottom of vessel 26 for conveying the liquid within this vessel to a smaller auxiliary heating vessel or container 30. The piping 29 is illustrated as provided with a clean-out 31 and valves 32 for controlling the flow of fluid therethrough. Preferably, the piping 29 is of relatively small diameter so as to prevent a reverse circulation of heated fluid from auxiliary tank 30 back into the larger tank 26.

The drink, when put into the main tank or container 26, is usually cold and is heated to any desired temperature after the same enters auxiliary tank 30. In order to supply the requisite amount of heat to the auxiliary vessel or tank 30 for heating the liquid drink therein to the desired temperature, an electric heater unit 33 of substantially disc shape is positioned beneath the bottom of tank 30. The electric heater 33 is illustrated as mounted upon a plate 34 carried by the frame member 17.

An adjustable thermostatic switch 35 of any well known construction, is mounted upon the upper portion of vessel 30 for regulating the supply of electric energy to the electric heater 33. The thermostatic switch 35 is adapted to control the electric heater 33 so that the liquid within vessel 30 will be maintained at any desired temperature suitable for drinking, the said temperature being determined by the setting of the thermostatic switch. A vent pipe 37 of relatively large diameter is secured to the top of auxiliary vessel 30 and extends upwardly therefrom for a suitable distance so that the open top of this vent pipe will be at least as high as the top of the container 26, so that regardless of the height of the liquid level 38 within the main supply vessel 26, this liquid level will always remain within the vent pipe 37 and will not overflow this vent pipe. Vent pipe 37 being open at its top enables any vapors or gases that may be formed within the auxiliary vessel 30 to readily escape. The lower portion of the auxiliary heating vessel 30 is connected by a pipe 39 to a liquid measuring valve 40.

Figures 1, 11, 12, 13:
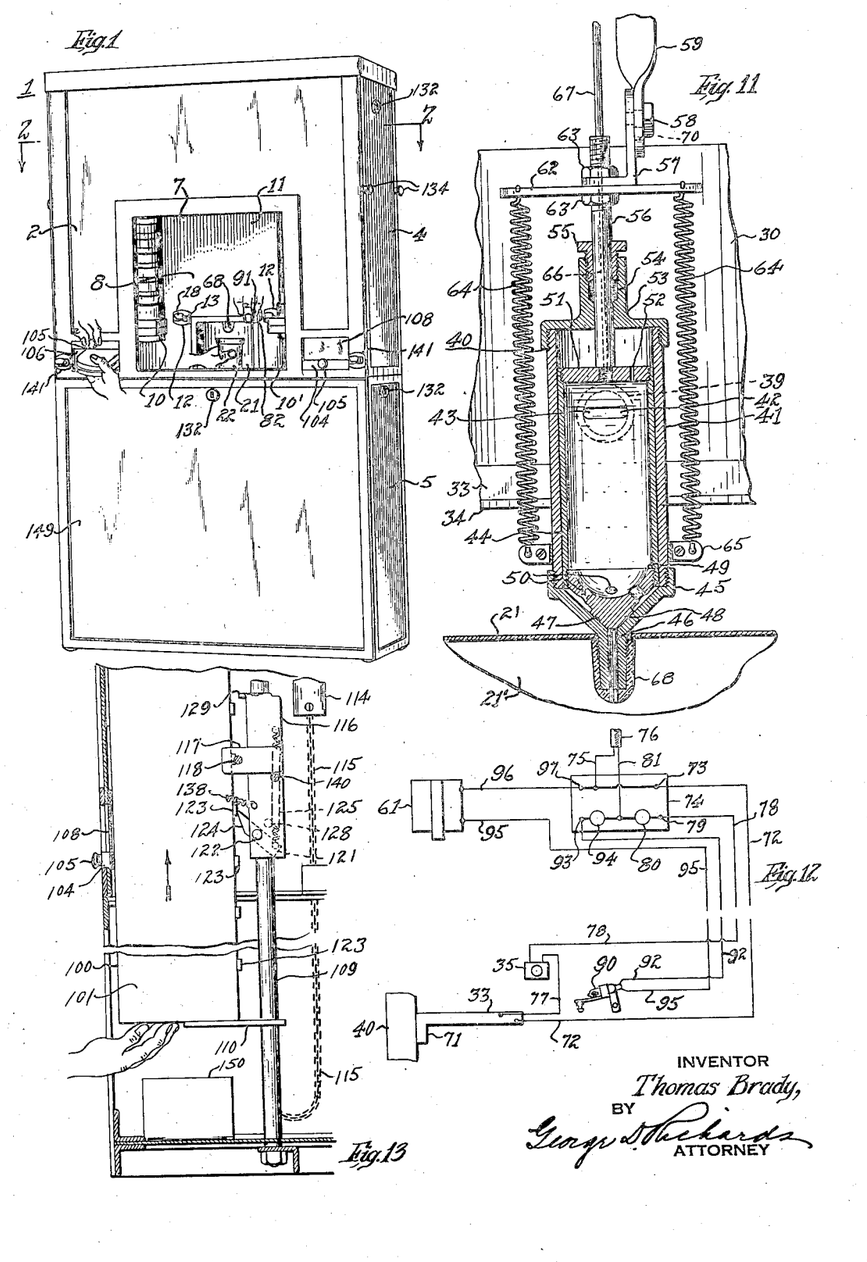
Fig. 1 is a perspective view of the novel food and drink vending machine of the present invention and illustrates the hands of users about to receive food and drink from the machine.
Fig. 11 is a sectional view taken substantially along line 11—11 of Fig. 10, looking in the direction of the arrows.
Fig. 12 is a wiring diagram of the circuits involved.
Fig. 13 is a fragmentary sectional view illustrating the upward motion of a food container after the same has been filled.
Figures 6, 7, 8, 9, 10, 15:
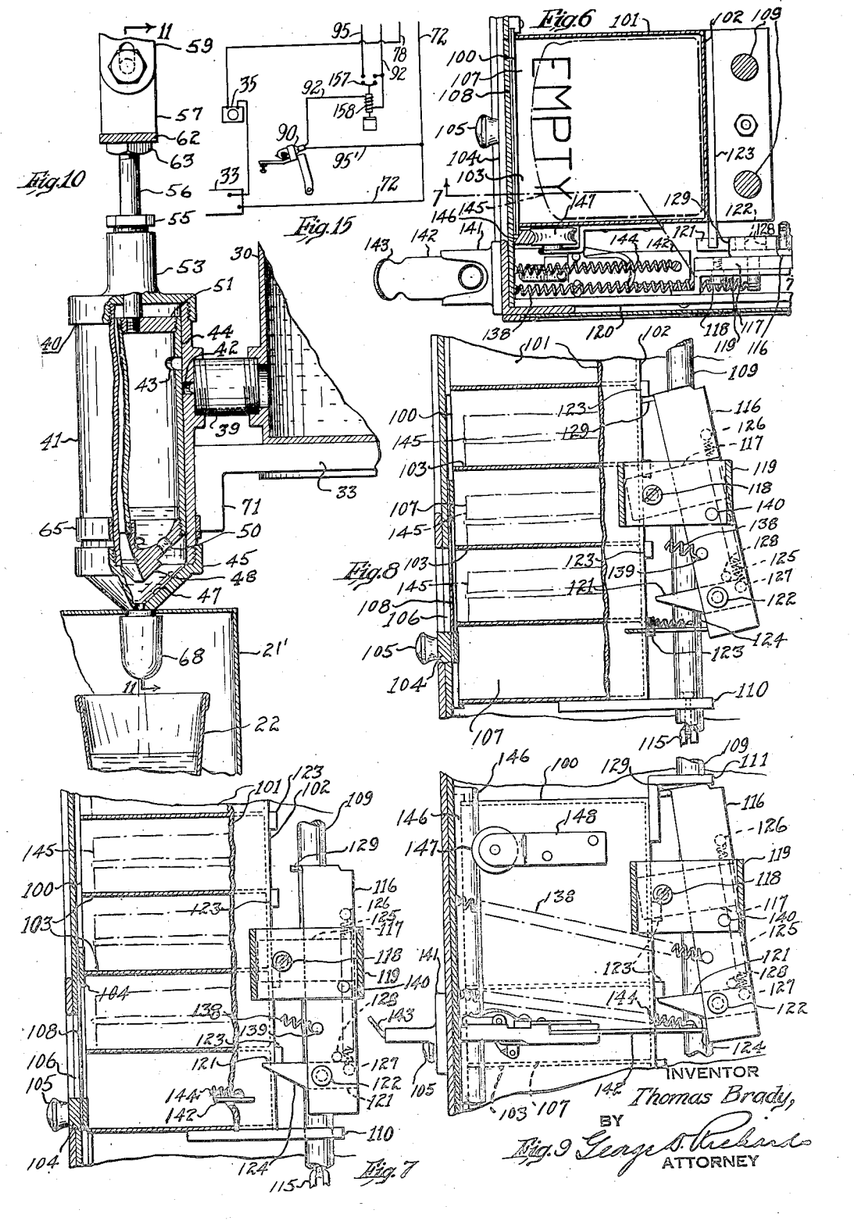
Fig. 6 is an enlarged fragmentary sectional view taken substantially along line 6—6 of Fig. 4 looking in the direction of the arrow.
Fig. 7 is a sectional view taken substantially along line 7—7 of Fig. 6, looking in the direction of the arrows.
Fig. 8 is a view similar to Fig. 7 but illustrates the food container during its downward motion.
Fig. 9 is a fragmentary view illustrating the operation of the mechanism for returning a coin when the food container is empty.
Fig. 10 is a fragmentary view in side elevation with parts broken away of the measuring valve and associated apparatus.
Fig. 15 is a slightly modified form of wiring diagram.

Liquid measuring valve 40, as especially shown in Figs. 10 and 11, comprises a tubular casing 41 having an aperture 42 in the wall thereof communicating with the pipe 39. The aperture 42 is in the form of a transverse slot, the same being relatively short in height, but relatively wide as measured in a transverse direction, as especially shown in Fig. 11. Slot or aperture 42 is adapted to communicate with a similar slot or aperture 43 provided in a hollow cylindrical valve body 44, whereby liquid from pipe 39 will flow into the valve body 44. The valve body 44 has a sliding fit within the tubular casing 41 and is adapted to be reciprocated within this casing. The lower end of casing 41 has a discharge fitting 45 threaded thereon, which discharge fitting has a central vertical discharge opening 46.

A conical valve seat 47 is provided within the discharge fitting 45 adjoining the top of the discharge opening 46, which valve seat is adapted to be engaged by a conical valve portion 48 provided at the lower end of the valve body 44. Conical valve portion 48 is illustrated as formed on a plug member 49 that is threaded into the lower portion of the tubular valve body 44 and constitutes the bottom of this valve body. Plug member 49 is provided with a number of apertures 50 for permitting liquid within the valve body 44 to flow out of this body and down through the discharge opening 46 when the conical valve portion 48 is lifted from its seat 47, as especially shown in Fig. 10.

A plug 51 is threaded into the upper portion of the valve body 44 and constitutes the top of this valve body. A small air vent hole 52 extends vertically through the plug 51 and provides communication between the interior of the valve body 44 and the space within casing 41 above this valve body, thereby permitting air above the valve body to readily escape into the valve body when the valve body moves upwardly in use and enabling a reverse flow of air when the valve body moves downwardly. The casing 41 has a cap 53 threaded thereon, which cap is provided with a stuffing box 54 and gland 55, through which extends a vertical cylindrical valve rod 56. The lower end portion of valve rod 56 is threaded through the plug 51 and the upper end portion of this valve rod is connected by an angle bracket 57 and a pivotal pin 58 to a vertical link 59.

Link 59 extends upwardly within the interior of the machine casing and has its upper end pivotally connected to the armature 60 of a solenoid 61. When the solenoid 61 is energized, its armature 60 will move upwardly, raising link 59, angle bracket 57 and valve rod 56, thereby effecting the raising of valve body 44 from its seat 47, permitting liquid within this valve body 44 to be discharged through discharge opening 46, as illustrated in Fig. 10. The link 59 preferably has a vertical slot 70 for receiving the pin 58, which slot permits armature 60 and link 59 to move upwardly a short distance in use before raising the angle bracket 57, thereby lessening the initial load on the armature 60.

A cross arm 62 is fixed upon valve rod 56 adjacent the angle bracket 57. Nuts 63 threaded upon the valve rod 56 and engaging the angle bracket 57 and the cross arm 62 serve to secure these members together and in fixed position upon the valve rod. A pair of tension springs 64 have their upper ends secured to the opposite ends to the cross arm 62 and have their lower ends secured to the end portions of a bracket 65 that is fixed to the lower part of valve casing 41. Tension springs 64 tend to urge cross arm 62 downwardly and hence urge valve rod 56 and valve body 44 downwardly so that its valve portion 48 will normally engage the seat 47, thereby effectively closing this valve. When the solenoid 61 is energized, however, this solenoid acting through link 59, serves to raise the valve body 44 against the tension of springs 64 permitting the escape of the measured quantity of liquid within this valve body. The initial upward movement of the valve body causes slot 43 to move upwardly and out of alignment with slot 42, thereby shutting off the supply of drink to the measuring valve body 44, so that only the liquid contained within this valve body passes into the cup 22. After the deenergization of the solenoid 61, springs 64 serve to again close the conical valve portion 48 upon its seat 47.

The valve rod 56 is provided with a central vertical vent opening or passage 66, which extends to the top of this valve rod. A vent pipe 67 of relatively small diameter has its lower end threaded into the upper portion of the passage 66 and its upper end portion extends over and into the relatively large vent pipe 37, as especially shown in Fig. 4. Vent pipe 67 serves as a continuation of passage 66 and permits the egress of air from the valve body 44 while this valve body is filling with liquid and also permits the ingress of air into this valve body while the valve body is being emptied. Should any liquid tend to travel upwardly through passage 66 and vent pipe 67, the same will be discharged into the large vent pipe 37.

When the conical valve portion 48 engages its seat 47 under the action of tension springs 64, the slots 42 and 44 are aligned, thereby permitting hot drink to readily flow from auxiliary vessel 30, through pipe 39 and into the interior of valve body 44, thereby filling this valve body, the internal volume of this valve body being predetermined so as to deliver a desired quantity of drink at one time. When the valve body 44 is raised in use, the narrow port 43 immediately moves out of registration with port 42, thereby shutting off communication between the interior of this valve body and the supply pipe 39, while at the same time valve portion 48 in lifting off of its seat 47 enables the measured quantity of liquid within the interior of valve body 44 to drain down through passage 46 and into the cup 22. A sanitary non-metallic nipple 68 is shown threaded upon the lower end of discharge fitting 45.

The electric heater unit 33 is illustrated as having an extension 71 engaging the valve casing 41 for retaining the liquid within the valve body 44 at the desired temperature for drinking. As especially shown in the wiring diagram of Fig. 12, the heater unit 33 has one terminal thereof connected by a lead 72 to a terminal post 73 provided on a fuse block 74 that is mounted at the top of the machine casing. Terminal post 73 of the fuse block is connected through the fuse block to a lead 75 of a current supply cable 76. The other terminal of electric heater unit 33 is connected by a lead 77 to one terminal of the thermostatic switch 35, the other terminal of which switch is connected by a lead 78 to a terminal post 79 of the fuse block 74. Terminal post 79 is connected through a fuse 80 to the other lead 81 of the supply cable 76.

A coin chute 82, mounted upon the rear wall 11 of the casing 9, is employed for controlling the operation of the solenoid 61. The slide 83 of the coin chute 82 has a cam plate 84 mounted thereon, which cam plate is adapted to engage the head of a screw 85, which screw is attached to a switch lever 86 having the shape of a bell crank. Lever 86 is pivotally mounted upon a pin 87 carried by a bracket 88 that is attached to an angle bar 89 used in supporting the container 26. Lever 86 has a mercury contact switch 90 secured thereto, the said switch being actuated to "on" and "off" positions by angular movement of lever 86 about its supporting pin 87, the angular movement being imparted to the lever 86 by the cam plate 84. The weight of switch lever 86 normally positions the same in the position shown in Fig. 4, in which position this lever engages a suitable stop 99 illustrated as provided in bracket 88.

Figures 4, 5, 16:
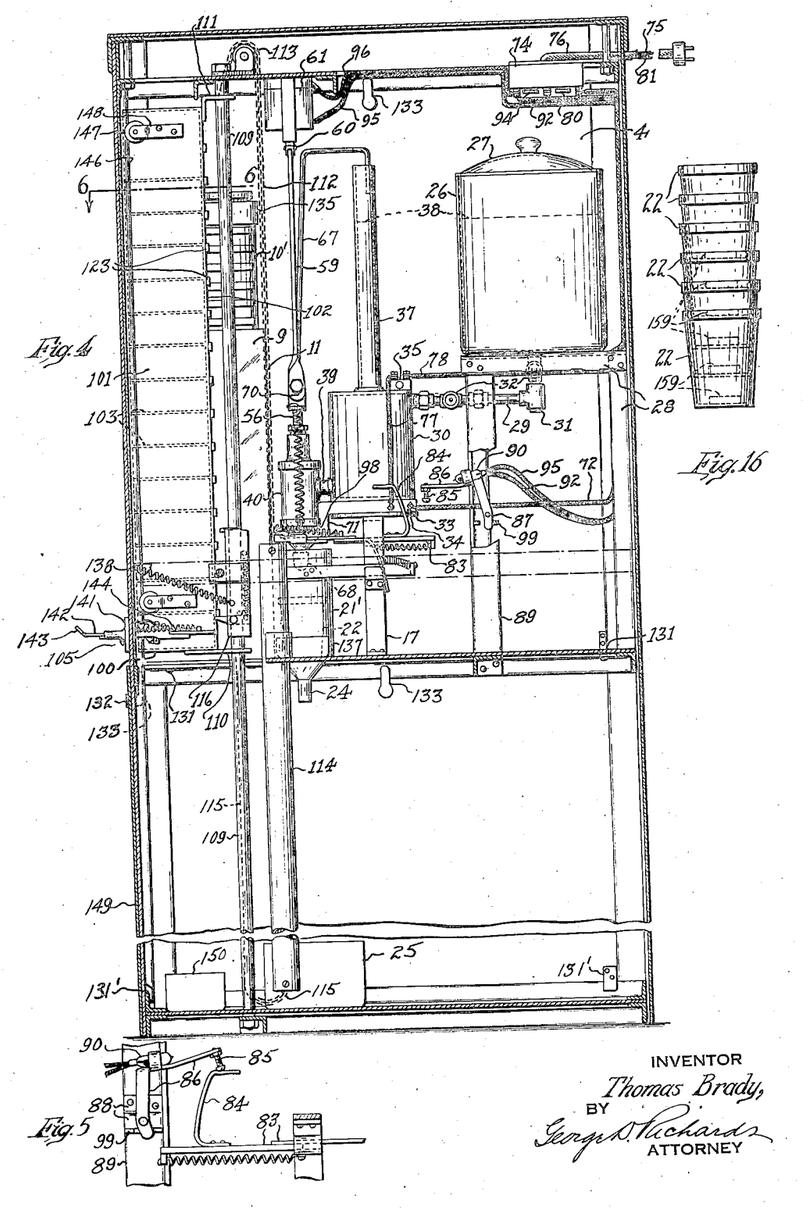
Fig. 4 is a sectional view taken substantially along line 4—4 of Fig. 2 looking in the direction of the arrows.
Fig. 5 is an enlarged sectional view taken substantially along line 5—5 of Fig. 2 looking in the direction of the arrows with the switch in closed position.
Fig. 16 is a fragmentary view in elevation showing stacked cups having cubes or capsules of food or drink concentrates therein, which cups may be used in lieu of empty cups.

Thus, in use, when the proper coin is inserted into the slide 83 of coin chute 82 and the operating knob 91 of this coin chute pushed inwardly, the cam plate 84 is carried rearwardly and engages the head of screw 85, thereby raising this screw and turning the switch lever 86 in a clockwise direction, as viewed in Fig. 4, thereby moving the mercury contact switch from its open position, shown in Fig. 4, to its closed position, shown in Fig. 5. One terminal of mercury contact switch 90 is connected by a lead 92 to a terminal post 93 provided on the switch block 74. Terminal post 93 is connected through a fuse 94 to the lead 81 of cable 76. The other terminal of the mercury contact switch 90 is connected by a lead 95 to one terminal of the solenoid 61, the other terminal of which solenoid is connected by a lead 96 to a terminal post 97 of the fuse block 74. Hence, with the mercury switch 90 closed, a circuit is established from cable lead 81, through fuse 94, to the lead 92, mercury contact switch 90, lead 95, solenoid 61, and lead 96 to the other lead 75 of cable 76.

The energization of solenoid 61 effects the raising of the armature 60 resulting in the dispensing of a drink into the cup 22 positioned below the nipple 68 of the measuring valve. After the predetermined quantity of hot liquid within the measuring valve has run into the cup, thereby filling the latter, the purchaser releases his pressure upon the knob 91, whereupon a spring 88 connected to the slide 83 serves to move this slide forwardly into its initial inoperative position. The forward movement of the slide 83 causes cam plate 84 to also move forwardly and out of contact with the screw 85, whereupon the switch lever 86 turns under the action of gravity in a counterclockwise direction, as viewed in Fig. 4, thereby opening mercury contact switch 90 and deenergizing solenoid 61 so that armature 60 in falling permits tension springs 64 to close the measuring valve and permit the valve body 44 thereof to again become filled with hot liquid from auxiliary reservoir 30, preparatory to another operation of the coin chute 82. As fast as liquid is drawn from the auxiliary reservoir 30, additional liquid is supplied thereto from main reservoir 26 by way of piping 29.

To replenish the liquid in the main reservoir 26 it is merely necessary to remove one of the removable side panels 4 and refill the reservoir 26. The side panels 4 are provided with spaced lugs 131 near their lower edges, which lugs have inwardly offset lower end portions for projecting into apertures provided in the machine frame, thereby retaining the lower part of these panels 4 in place. Locks 132 are provided on the panels 4 near the tops of these panels and have pivotal latch bolts 133 for engaging the machine frame to thereby retain the upper part of panels 4 in place.

When it is desired to remove a panel 4, the proper key is inserted into the lock 132 and used to turn the pivotal latch bolt 133 downwardly, whereupon the panel may be grasped as by knobs 134 provided thereon and raised slightly thereby disengaging lugs 131 from the machine frame and permitting the panel to be bodily removed from the machine. By removing panels 4, access is also had to the open upper ends 135 of the cup dispensers, thereby enabling additional cups to be inserted into these dispensers. Also, access is thus provided to the coin boxes 136 and 137, used for collecting coins discharged from coin chutes 12 and 82. The removable side panels 5 are also provided with spaced lugs 131' at their lower edge portions for engaging the machine frame. These panels also have locks 132 provided with pivotal latch bolts 133 for securing the panels in place. By removing either or both of these lower side panels, access is had to the lower interior portion of the machine casing.

The food vending portion of the machine consists of one or more vertically extending containers 100, which containers are illustrated as of rectangular or prismatic shape and of substantially square cross section, although it is to be understood that these containers may have any desired shape to accommodate the particular food dispensed. The containers 100 are illustrated as having a substantially square cross section in order to readily receive and dispense sandwiches. Two of the food containers 100 are shown in the machine illustrated in the drawings, there being one of these containers at each side of the drink dispensing portion of the machine, although it is to be understood that a greater or lesser number of these food containers may be used. For example, these food containers may be arranged along the sides of the machine as well as at the front thereof, if desired. Also, the drink vending portion of the machine may have drink dispensing outlets at the sides of the machine, if desired, in addition to the one at the front of the machine. In the event that the same drink is dispensed at the sides of the machine as at the front thereof, the main vessel 26 may be used as a common supply for all of the drink dispensers.

The food containers 100 are open at the front and have side walls 101 and a rear wall 102. The interior of the containers 100 are divided into a plurality of small compartments by means of shelves 103, which shelves are adapted to support the sandwiches to be dispensed. The fixed upper portion of the front wall 2 of the machine is provided with vertically slidable doors 104 having knobs 105 thereon for permitting the manual lifting or opening of these doors. When the doors 104 are moved to open position, a rectangular opening 106 is provided in the front wall 2, which opening is of substantially the same size as one of the sandwich compartments 107 provided between two consecutive shelves 103 of the food containers. The doors 104 are illustrated as having transparent windows 108 therein to enable the purchaser to see the sandwich he has purchased resting on one of the shelves 103.

Each of the food containers 100 is vertically movable within the interior of the machine casing so that consecutive sandwich compartments 107 may be brought successively into alignment with the door opening 106. In order to guide each food container 100 in its vertical movement, a pair of guide rods 109 are provided at the rear of each container and extend from the bottom of the machine casing to the top thereof. These guide rods are illustrated as of circular cross section and extend through conforming slide bearing apertures provided in bearing members 110 and 111 secured to the bottom and to the top of the food container. The upper bearing member 111 is in the form of an angle iron. A supporting chain 112 is connected to bearing member 111 substantially midway of the width of this bearing member.

Chain 112 extends upwardly and over a pulley 113 provided at the top of the machine. From pulley 113 the chain 112 extends downwardly and has its lower end connected to a counterweight 114 having the form of a tube open at its top and closed at its bottom. The weight of tube 114 may readily be adjusted so as to almost equal the weight of the container 100 when the same is empty by placing shot or other material within the hollow interior of this counterweight 114. A compensating chain 115 is illustrated as having one end thereof connected to the lower end of the counterweight 114. Chain 115 extends from the counterweight 114 to the lower bearing plate 110 and serves to counterbalance the weight of chain 112 in use. It will be apparent that this compensating chain may be omitted, if desired. The use of the counterweight 114 together with the compensating chain 115 provides for the easy and quiet movement of the container 100 within the machine casing in use.

With the container 100 filled with sandwiches or other food to be dispensed, the same is positioned in the upper part of the machine casing, as illustrated in Fig. 4, and coin control mechanism is provided for controlling the lowering of this food container in successive steps or distances equal to the spacing of the consecutive shelves 103, so that successive food or sandwich compartments 107 are brought opposite the door 104, thereby enabling purchasers to remove the purchased food.

The mechanism used for effecting the step by step downward movement of the food container consists of a lever 116 (see Figs. 6 and 9) having a fulcrum arm 117 substantially midway of its length, which arm is pivotally mounted upon a pin 118 carried by a bracket 119, that is shown as fixed to a transverse bar 120 constituting a part of the machine frame. Lever 116 has a pivotal pin 122 secured to its lower portion, and upon this pivotal pin is turnably mounted a pawl 121 for cooperating with transverse stop bars 123 secured at regular intervals to the rear wall 102 of the food container. The upper surface of the pawl 121 is straight, whereas the forward portion of the under surface of this pawl is beveled as at 124, for a purpose which will further appear.

A tension spring 125 has its upper end attached to a pin 126 carried by the lever 116 and its lower end attached to a pin 127 that is carried by the pawl 121. Spring 125 urges pawl 121 in a counterclockwise direction as viewed in Figs. 4 and 7. The turning of pawl 121 under action of tension spring 125 is limited by a stop pin 128 that is secured to the lever 116 and engages the upper surface of the pawl 121, thereby serving to normally position the upper surface of pawl 121 so that the same extends substantially transversely of the lever 116. The upper portion of lever 116 is provided with an offset stop projection 129 for cooperating with the transverse bars 123 carried by food container 100. The pivotal pin 118 is preferably positioned substantially half way between the upper surface of pawl 121 and the upper surface of stop projection 129.

With one of the transverse bars 123 resting upon the upper surface of pawl 121, as shown in Figs. 4 and 7, one of the food compartments 107 is positioned so as to register with the opening 106 provided by the raising of the door 104. Also, with one of the bars 123 resting upon the pawl 121, the stop projection 129 is positioned substantially half way between the lower surfaces of two consecutive bars 123. A coil tension spring 138 has one end thereof secured to the machine frame and its other end attached to a pin 139 carried by lever 116. Spring 138 tends to turn lever 116 in a clockwise direction, as viewed in Figs. 4 and 7. The turning of lever 116 under the action of spring 138 is limited, however, as by a stop pin 140 carried by bracket 119 and engaging the under surface of the arm 117 of this lever. Thus, the lever 116 is normally positioned by stop pin 140 so as to extend in a substantially vertical direction with the pawl 121 extending transversely of this lever.

A coin chute 141 is mounted upon the front wall 2 of the machine casing adjacent the food container 100. The slide 142 of this coin chute is disposed for engaging the lever 116 when the coin chute is operated. Thus, when the proper coin is inserted into the coin chute 141 and the knob 143 thereon pressed inwardly, the slide 142 of this coin chute, in moving inwardly, will engage the lower portion of lever 116 and swing this lever in a counterclockwise direction from the position shown in Fig. 7 to the position shown in Fig. 8.

As the lever 116 commences to move in its counterclockwise direction by turning about its pivotal support 118, the pawl 121 slides rearwardly and from under the stop bar 123. At the same time that the pawl 121 moves rearwardly, the stop projection 129 of lever 116 moves forwardly so as to underlie another of the transverse stop bars 123. As soon as the pawl 121 completely disengages the stop bar 123 resting thereon, the food container 100 will move downwardly, under the action of gravity, a distance equal to substantially one-half the height of a food compartment 107 or until a bar 123 engages the upper surface of stop projection 129, as especially shown in Fig. 8. Owing to the use of counterweight 114 and compensating chain 115, the container 100 moves downwardly smoothly and quietly and comes to rest on stop projection 129 without jolting or jarring. The purchaser now releases his pressure upon the knob 143, thereby permitting a tension spring 144 to move the slide 142 forwardly and out of engagement with the lever 116.

As soon as the slide 142 commences to move forwardly, the tension spring 138 acts to turn lever 116 in a clockwise direction, as viewed in Fig. 8, so that the stop projection 129 slides rearwardly and from under the stop bar 123 resting upon this stop projection, while at the same time the pawl 121 moves forwardly so as to underlie the next succeeding stop bar 123. The food container 100 then continues its downward movement for a distance equal to the remaining half of the height of a food compartment, or until the next successive stop bar 123 comes to rest upon pawl 121, thereby bringing the next successive food compartment into registry with the door 104. The purchaser now opens the door 104 and removes his sandwich 145 or other article of food contained therein. As each successive purchaser inserts a coin into the coin chute 141 and operates this coin chute, the lever 116 will function to lower the food container in two successive steps, equal in all to the height of one of the food compartments so that each such purchaser may remove the purchased sandwich or other food or article. Thus, the food container 100 descends lower and lower as food is dispensed therefrom until it reaches the lower limit of its travel illustrated in Fig. 9.

With the food container 100 at the lower limit of its travel, the highest food compartment 107 is positioned opposite the door 104 so as to enable the removal of the last sandwich from the container. The shelf 103 of the highest food compartment 107 preferably has the word "Empty" depicted upon the upper surface thereof adjacent the door 104, so that when the last sandwich is removed, this word may be readily observed through the transparent window 108 of the door. Thus, in Fig. 6, the uppermost food compartment is illustrated, and shows the word "Empty" written on the shelf 103 thereof. In the event that a purchaser should not see the word "Empty" through the window 108 and should insert the proper coin into coin chute 141, means is provided for effecting the return of his coin to him.

The means for preventing the operation of the coin chute 141 and for returning the coin to the purchaser when the food container 100 is empty, consists in employing a suitable stop for limiting the pivotal turning movement of lever 116, thereby preventing such lever from swinging rearwardly the necessary distance to effect the lowering of the food container. In the machine shown in the drawings, the upper bearing member 111 is employed as the stop for preventing a complete movement of lever 116. This construction is illustrated in Fig. 9, wherein the purchaser has pushed in the knob 143 as far as it will go and shows the stop projection 129 of lever 116 abutting against the vertical flange portion of angle bearing member 111. This bearing member 111 prevents the lever 116 from moving far enough to effect the discharge of the coin held by the slide 142 of coin chute 141 so that when the purchaser releases the knob 143 the coin slide 142, upon being returned to its forward position by its spring 144, will also serve to return the coin to its initial position enabling the purchaser to remove the same.

Preferably, a vertical track 146 is provided at the front end of the machine adjacent the side of the food container 100. Rollers 147, carried by brackets 148 attached to the side wall 101 of the food container, ride upon the track 146. The purchaser, in pushing upon the knob 143 and exerting pressure upon lever 116 when the container is empty, tends to turn this lever 116 in a counterclockwise direction, as viewed in Fig. 9, which motion is prevented by offset stop projection 129 abutting the angle guide 111. The pressure of stop projection 129 upon angle guide 111 tends to throw the food container 100 forwardly, which forward motion is effectively prevented by rollers 127 engaging track 146. These rollers also act as additional guides for the container 100 during its vertical movement.

In replenishing the container 100 with sandwiches or other food, it is merely necessary to remove the lower removable panel 149 of the front wall 2. This removable panel 149 is normally retained in place by lugs 131' near the lower edge of the panel, which lugs cooperate with the machine frame in the same manner as the lugs 131' heretofore described in connection with the side panels 4. Panel 149 is also provided with a lock 132 having a pivotal latch bolt 133. Thus, by inserting the proper key in lock 132 and turning the latch bolt 133, panel 149 may be removed. With panel 149 removed, ready access is had to the forward open ends of compartment 107, since with food container 100 in its lowermost position, these food compartments are opposite the panel 149. After filling the compartments 107 with sandwiches or other food, the container 100 is manually raised to its uppermost position. This upward movement of the food container is easily performed, as illustrated in Fig. 13, by merely giving the food container an upward push with the hand. Since pawl 121 is pivoted on pin 122, the stop bars 123, during the upward movement of the food container, merely ride over the lower beveled portion 124 of the pawl 121, thereby swinging this pawl upwardly about its pivotal pin 122 and against the tension of spring 125, as illustrated in Fig. 13. As soon as the food container reaches this highest position, the pawl 121 will snap under the lowermost stop bar 123, thereby retaining the food container in its uppermost position ready for further use.

Experiment has shown that it takes but a few moments to fill the food container 100 with sandwiches and push the same upwardly by means of the hand or foot to its highest position ready for further use. The counterweight 114 serves to assist in moving the food compartment 100 upwardly so that the same travels quietly and quickly with each successive stop bar 123 readily passing the pawl 121. Upon the replacement of front panel 149 the machine is ready for further use. Coin boxes 150 are provided at the bottom of the machine under the coin chutes 141 for receiving coins discharged from these coin chutes. Boxes 150 are readily accessible by removal of the front panel 149.

Thus it is seen that the mere operation of the proper coin chute is all that is necessary to effect either the vending of a desired drink or the vending of food, such as sandwiches. It will be apparent that any number of food containers may be used in the machine and that a number of drink dispensers may also be used if desired, each of said drink dispensers serving to dispense a definite quantity of drink at each operation.

Figure 14:
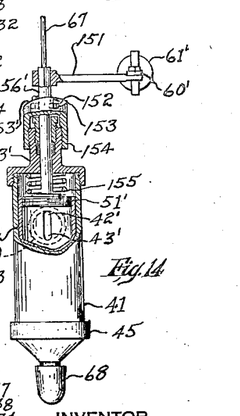
Fig. 14 is a view with parts broken away of the measuring valve provided with a different operating means.

Although the measuring valve 40 is illustrated as operated by a solenoid 61 mounted at the top of the machine for exerting a direct pull upon the valve rod 56, it will be apparent that this measuring valve may be operated in many other ways, including manual operation. For example, in Fig. 14, this measuring valve is shown as operated by a lever 151 that is fixed upon valve rod 56' and is turned to open position by an armature 60' of a solenoid 61'. Valve rod 56' has a cross pin 152 extending therethrough for resting upon complementary lift cams 153 and 153' formed on a tube member 154 carried by a cap 53'. A compression spring 155 is shown contained within valve casing 41 and presses downwardly upon plug 51', thereby serving to close valve body 44 upon its seat (not shown) when the solenoid 61' is deenergized. In order to facilitate the rapid shutting off of the supply of liquid to the valve body 44 when this valve body is raised in use, the liquid inlet apertures or slots 42' and 43' in the casing 41 and valve body 44, respectively, are disposed vertically instead of horizontally as shown in Figs. 10 and 11. The measuring valve of Fig. 14 operates in much the same manner as the valve shown in Figs. 10 and 11, with the exception that the complementary lift cams 153 and 153' serve to effect the lifting of the valve body 44 when a drink is dispensed, the cross pin 152 riding up on cams 153 and 153' under the turning action of lever 151 which is actuated by armature 60'.

It will be apparent that in obtaining drinks from the machine, the operating knob 91 of the coin chute 82 must be held in its inwardly pressed position during the period of time it takes the drink to be dispensed from the measuring valve 40, which period is only a few moments; however, some purchasers not used to the machine may merely press the knob 91 inwardly momentarily and then release the same before the drink has been entirely dispensed, causing spring 98 to return slide 83 and effect the deenergization of solenoid 61 and the consequent closing of the measuring valve 40 before the entire drink has been disposed into cup 22, thereby depriving the purchaser of his full quantity of drink. To overcome this objection, especially in localities where there are many transient purchasers, the switch 90 instead of being directly connected in the circuit of the solenoid 61 may be connected to the operating coil of a time relay, which time relay in turn is connected in the circuit of solenoid 61, the time relay operating in a manner well known to those skilled in the art to delay the opening of the circuit of solenoid 61 in use so that ample time is provided to permit all of the drink to be dispensed from valve 40 even though knob 91 is pushed in only momentarily.

Thus, the wiring diagram of Fig. 12 may be modified slightly as shown in Fig. 15 to incorporate a time relay 157 therein. As illustrated in this wiring diagram, the mercury switch 90 is adapted, when closed, even momentarily, to energize the operating coil 158 of time relay 157, thereby effecting the instant closing of this time relay by passage of current from lead 72 through lead 95', switch 90, lead 92, through coil 158 back to the source of supply. The closing of relay 157 completes a circuit through lead 92, relay 157, lead 95, solenoid 61, and lead 96 back to the source of supply. Even if the switch is again immediately reopened by releasing the coin chute knob 91, the time relay 157 will remain closed for a definite period, depending upon the predetermined time constant on this relay, thereby enabling all of the beverage to be dispensed from the valve 40 before the solenoid 61 is deenergized to effect the closing of this valve. The upper part of the wiring diagram has been omitted from Fig. 15 because the same is identical with that in Fig. 12.

If desired, instead of premixing all of the drink ingredients and pouring the completed drink into the main container 26 to be later heated in the auxiliary vessel 30 preparatory to dispensing the same, only a portion of the ingredients of the drink may be placed in container 26 and the remaining portion of the ingredients, having the form of a cube or powder, may be placed in the individual cups 22. Thus, in Fig. 16 cups 22 are shown in stacked condition, ready for insertion into the cup dispensers 10 and 10'. In the bottom of each of these cups 22, there has been placed a cube or capsule 159 of a food or drink concentrate, such as a bullion cube or powdered milk, for example.

Where the cube 159 is a bullion cube or the like, the container 26 would ordinarily be filled with water and a purchaser after putting the proper coin in the coin chute 12 and obtaining his cup having the bullion cube 159 therein, would then operate the coin chute 82, thereby obtaining hot water from the measuring valve 40, the hot water serving to dissolve the bullion cube, thereby producing beef tea.

Some drink ingredients, such as milk, become rancid or spoil when in their common forms, but when these ingredients are put into powdered or compressed cake form, such as powdered milk, they last indefinitely. Thus, if the cubes or capsules 159 are formed of powdered milk, the purchaser after obtaining a cup with a cube therein, will place the same under nipple 68 of the measuring valve and after operating slide 93 of coin chute 82, will receive the remaining ingredients of the drink. In this case, the proper ingredients for completing the drink are inserted into the container 26. Thus, if coffee is dispensed from the machine, coffee without milk is inserted into container 26. On the other hand, if tea is being dispensed, tea without milk is inserted into this container, and the hot coffee or tea, as the case may be, will flow into cup 22, thereby dissolving the powdered milk forming the cube or capsule 159.

In order to easily maintain the containers 26 and 30 together with the measuring valve 40 in a wholesome and sanitary condition, it may be desirable to only insert water into the container 26, in which case the remaining ingredients of the drink are combined into a cube, wafer or capsule 159 that is placed in the cups 22. For example, if it is desired to dispense coffee while using only water in the container 26, a wafer 159 or cube is formed of a mixture of powdered milk, sugar and coffee concentrate, which wafer may or may not be covered by a protective coating, such as gelatin. After receiving a cup having such a wafer 159 therein, the purchaser merely inserts the cup under nipple 68 and operates the coin chute 82 to thereby cause the measuring valve 40 to discharge hot water into the cup. The hot water on contacting with the composition wafer or cube, immediately dissolves the same, producing the complete drink without the necessity of stirring the contents of the cup.

In the following claims, the word "beverage" is intended to cover any type of drink or portion of the liquid ingredients of a drink which is adapted to be dispensed in liquid form.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

What is claimed is:

1. In a vending machine of the character described, a main beverage reservoir, an auxiliary reservoir connected to said main reservoir for receiving beverage flowing by gravity therefrom, said auxiliary reservoir being of lesser capacity than said main reservoir and having an air vent at its top for permitting the escape of vapors, means for heating the beverage within said auxiliary reservoir, a liquid measuring valve connected to said auxiliary reservoir, said liquid measuring valve having a hollow valve body therewithin of a size for receiving a predetermined quantity of beverage, and coin controlled means for causing the operation of said measuring valve to effect the dispensing of beverage from said hollow valve body.

2. In a vending machine of the character described, a main reservoir for receiving and retaining beverage at ordinary temperatures, an auxiliary reservoir of smaller capacity than said main reservoir for receiving beverage flowing by gravity from said main reservoir, a heater associated with said auxiliary reservoir for heating the beverage therein to a desired temperature for drinking, a liquid measuring valve connected to said auxiliary reservoir, said liquid measuring valve comprising a casing arranged to be heated by said heater, said casing being provided with a discharge port, and a hollow valve body movable within said casing, said valve body having ports therein, one of said ports being arranged to communicate with said auxiliary reservoir for receiving heated beverage therefrom, and another of said ports being arranged to communicate with the discharge port of the casing of said liquid measuring valve, and coin controlled means for causing movement of said hollow valve body within its casing, whereby communication between its first named port and said auxiliary reservoir is shut off substantially simultaneously with the establishment of communication between its second named port and the discharge port of said valve casing.

3. In a vending machine of the character described, a main beverage reservoir for retaining beverage at ordinary temperatures, a relatively small auxiliary reservoir connected to said main reservoir for receiving beverage from said main reservoir, a heater for heating the contents of said auxiliary reservoir, thermostatic means for controlling the operation for said heater whereby the beverage within said auxiliary reservoir is maintained at a desired temperature for drinking, a vent pipe connected to the top of said auxiliary reservoir and extending upwardly above the liquid level of said main reservoir whereby vapors formed in said auxiliary reservoir are permitted to escape, a liquid measuring valve connected to said auxiliary reservoir for receiving beverage therefrom, said measuring valve comprising an exterior casing having an inlet port therein communicating with said auxiliary reservoir and a discharge port therein positioned for delivering beverage to a cup or other container, a hollow valve body movable within said casing, said valve body having one port therein arranged, when said valve body is in one position, to register with the inlet port of said casing so that said valve body receives a predetermined quantity of beverage, said valve body having a second port arranged to discharge the liquid contents of said valve body through said valve casing discharge port when said valve body is moved to another position, in which latter position said first named valve body port is out of registry with said casing inlet port.

4. In a vending machine of the character described, a main beverage reservoir for retaining beverage at ordinary temperatures, a relatively small auxiliary reservoir connected to said main reservoir for receiving beverage from said main reservoir, a heater for heating the contents of said auxiliary reservoir, thermostatic means for controlling the operation of said heater whereby the beverage within said auxiliary reservoir is maintained at a desired temperature for drinking, a vent pipe connected to the top of said auxiliary reservoir and extending upwardly above the liquid level of said main reservoir whereby vapors formed in said auxiliary reservoir are permitted to escape, a liquid measuring valve connected to said auxiliary reservoir for receiving beverage therefrom, said measuring valve comprising an exterior casing having an inlet port therein communicating with said auxiliary reservoir and a discharge port therein positioned for delivering beverage to a cup or other container, a hollow valve body movable within said casing, said valve body having a valve rod extending exteriorly of said casing, said valve body being arranged, when in one position, to close the discharge port of said casing and to open the inlet port of said casing, whereby a measured quantity of beverage is caused to enter said valve, and mechanism for actuating said valve rod to move said valve body to another position, in which latter position said casing inlet port is closed and said casing outlet port is opened, thereby causing the measured quantity of beverage to be dispensed from said valve.

5. In a vending machine of the character described, a main beverage reservoir for receiving and retaining beverage at ordinary temperatures, a relatively small auxiliary beverage reservoir connected to said main reservoir for receiving beverage flowing under the action of gravity from the latter, a heater for heating the contents of said auxiliary reservoir, adjustable thermostatic means for controlling the operation of said heater, whereby beverage within said auxiliary reservoir is maintained at a desired temperature preparatory for drinking, the connection between said main and auxiliary reservoirs being such as to substantially prevent the flow of heated beverage from said auxiliary reservoir back to said main reservoir, said auxiliary reservoir having a vent portion projecting upwardly above the liquid level within said main reservoir, said vent portion being open at its top to permit the escape of vapors and gases formed in said auxiliary reservoir.

6. In a vending machine of the character described, a liquid measuring valve comprising a valve casing having an inlet port and a discharge port, a hollow valve body slidable within said valve casing, said valve body also having an inlet port and a discharge port, spring means for urging said valve body toward valve closing position, in which position said valve body closes said casing discharge port while the inlet port of said valve body registers with said casing inlet port, thereby enabling said valve body to become filled with liquid to be dispensed, the size of said valve body serving to measure the quantity of liquid to be dispensed, means connected to said valve casing for controlling the temperature of the beverage therein, and coin controlled means for moving said valve body against the tension of said spring means, whereby said valve body inlet port moves out of registry with said casing inlet port and said casing outlet port is opened, enabling the measured quantity of liquid within said valve body to flow through said outlet ports.

7. In a vending machine of the character described, a liquid measuring valve comprising a valve casing having an inlet port and a discharge port, a hollow valve body slidable within said valve casing, said valve body also having an inlet port and a discharge port, spring means for urging said valve body toward valve closing position, in which position said valve body closes said casing discharge port while the inlet port of said valve body registers with said casing inlet port, thereby enabling said valve body to become filled with liquid to be dispensed, the size of said valve body serving to measure the quantity of liquid to be dispensed, said valve body having a valve rod extending exteriorly of said valve casing, and a coin controlled solenoid having an armature connected to said valve rod for actuating the latter to cause said valve body to move against the tension of said spring means, whereby said valve body inlet port moves out of registry with said casing inlet port, thereby shutting off the supply of liquid to said valve body, and said casing outlet port is opened, causing the measured quantity of liquid in said valve body to be dispensed.

THOMAS BRADY.